June 10, 1930.   L. J. STACY ET AL   1,763,014
REGULATOR SYSTEM
Filed Nov. 6, 1928
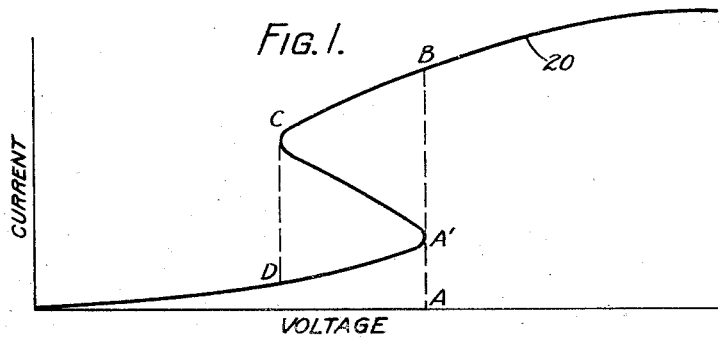
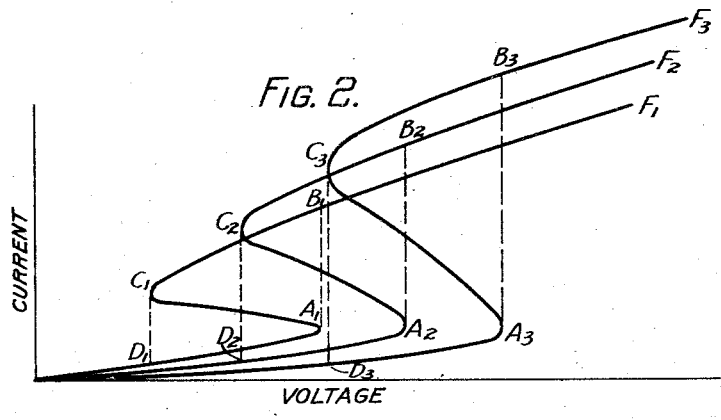
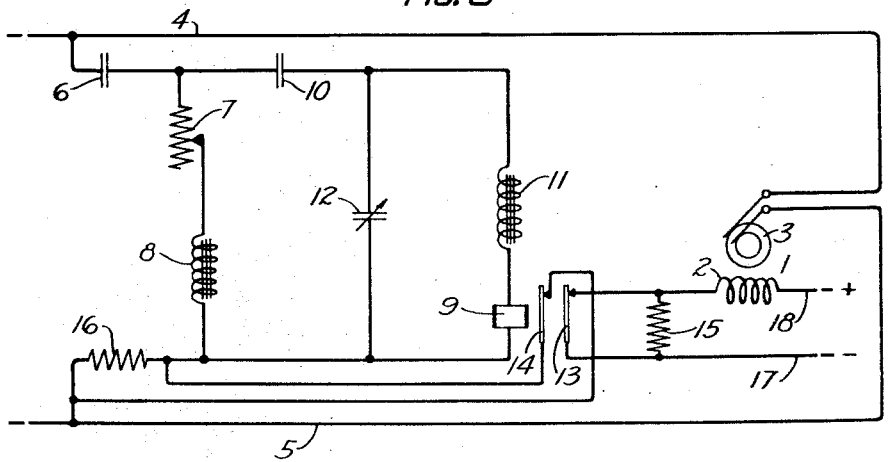
INVENTORS: L. J. STACY
M. E. KROM
BY Wayne B Wells
ATTORNEY Patented June 10, 1930

1,763,014

UNITED STATES PATENT OFFICE

LELAND J. STACY, OF CALDWELL, AND MYRON E. KROM, OF MADISON, NEW JERSEY, ASSIGNORS TO BELL TELEPHONE LABORATORIES, INCORPORATED, OF NEW YORK, N. Y., A CORPORATION OF NEW YORK

REGULATOR SYSTEM

Application filed November 6, 1928. Serial No. 317,583.

This invention relates to regulator systems and particularly to voltage regulator systems for governing the operation of alternating current generators.

One object of the invention is to provide a regulator system to control a generator and maintain substantially constant the voltage of the current produced thereby in a simple and an efficient manner.

Another object of the invention is to control a characteristic of a dynamo-electric machine by improved means under the control of the jumping phenomena present in ferro-resonance circuits.

A further object of the invention is to provide a voltage regulator system of the above indicated character that shall control the field windings of an alternating current generator to maintain constant the voltage of the generated current irrespective of the frequency of the generator current.

It has been determined by experimentation that when an alternating current generator which is connected in series with a capacity element and a coil having an iron core, and the generated voltage is gradually raised that the current slowly increases until a certain point is reached, whereupon a further increase in the voltage of even slight degree results in a sudden and large increase in current flow. This feature is called the "jumping phenomena in ferro-resonance." In a regulator system constructed in accordance with this invention the jumping phenomena in ferro-resonance is used to so control the excitation of a dynamo-electric machine as to maintain a characteristic of the machine substantially constant.

In a regulator system constructed in accordance with one embodiment of the invention, a control circuit including a capacity element, a coil having an iron core, and a regulator relay is connected across the generator circuit. The relay controls a regulator resistance element in series with the field-magnet windings of the generator and a control resistance element in the energizing circuit for the relay. When the voltage of the generator is below normal value the relay is held in released position and switch members under control of the relay short circuit the regulator and control resistance elements. When the generator voltage is raised to normal value a slight increase in the generated voltage causes a sudden increase in the current flow through the relay. This sudden increase in current flow is caused by the jumping phenomena in ferro-resonance. The control circuit is adjusted to effect a sudden increase in current flow at the desired generator voltage. The relay is operated by the sudden increase in current to remove the short circuit around the resistance elements respectively included in the generator field winding circuit and in the relay circuit. The resistance element in the circuit of the generator field winding reduces the generator voltage and the resistance element in the energizing circuit of the relay causes the relay to release. The switch members which control the resistance elements are arranged so that the shunt around the resistance element in the field winding circuit is opened prior to the opening of the shunt around the resistance element in the energizing circuit for the relay when the relay is operated. This causes an intermittent operation of the regulator very much in the manner of the Tirrill type regulator. A potentiometer comprising capacity, resistance and inductance is connected to the generator circuit for rendering the regulator independent of the generator frequency.

In our application Serial No. 218,697, filed September 10, 1927, is disclosed an alarm circuit which is under the control of the jumping phenomena in a ferro-resonance circuit. In the application of Myron E. Krom, Serial No. 317,594, filed November 6, 1928, is shown and claimed a modification of the regulator system.

In the accompanying drawing Figure 1 is a curve illustrating the operation of the ferro-resonant circuit included in the regulator system.

Fig. 2 is a view showing a set of curves similar to the one shown in Fig. 1 and illustrating the effect of changes in frequency on the ferro-resonant circuit.

Fig. 3 is a diagrammatic view showing a regulator system constructed in accordance with the invention.

Referring to Fig. 3 of the drawing, an alternating current generator 1 comprising a field-magnet winding 2 and an armature 3 is connected to supply conductors 4 and 5. A regulator system is connected in shunt across the supply conductors 4 and 5 for so controlling the excitation of the field-magnet winding 2 as to maintain the voltage of the generator substantially constant. Included in the regulator system is a potentiometer comprising the condenser 6, an adjustable resistance element 7, and an inductance element 8. The potentiometer serves to control the regulator system to compensate for changes in frequency of the current supplied by the generator 1 to the supply conductors 4 and 5. The manner in which the potentiometer controls the regulator circuits to compensate for changes in frequency of the current generated will be described hereinafter.

A relay 9 is connected in a ferro-resonant circuit across the inductance 8 and the resistance element 7 of the potentiometer, as shown in Fig. 3 of the drawing. The ferro-resonant circuit comprises a condenser 10 and an inductance 11 having an iron core. An adjustable condenser 12 is connected across the circuit for cooperating with the adjustable resistance element 7 to adjust the circuit so that for a commercial condenser and a commercial iron core coil such as 11, the circuit may be adjusted to operate within close limits. This feature will be explained hereinafter.

The relay 9 is provided with two switch members 13 and 14 for controlling a regulator resistance element 15, and a control resistance element 16. The regulator resistance element 15 is included in the circuit of the field-magnet winding 2 and is adapted to be shunted by the switch member 13 when the relay is in a released position. The control resistance element 16 is included in the energizing circuit for the relay and is short-circuited by the switch member 14 when the relay is in a released position. The conductors 17 and 18, which are connected to a source of direct current, are provided for supplying current to the field-magnet winding 2 of the generator 1.

Disregarding for the present the operation of the potentiometer comprising the condenser 6, the resistance element 7 and the inductance element 8 and also the adjustable condenser 12, the operation of the ferro-resonant circuit will be described referring to Fig. 1 of the drawing. The curve shown in Fig. 1 is plotted between the current passing through the ferro-resonant circuit and the voltage of the generator 1. A gradual increase in the voltage of the generator from a voltage below normal value produces only a gradual increase in the current flow through the ferro-resonant circuit until a voltage A is reached. When the voltage A is reached, a very small increase in the generator voltage will cause a sudden increase in current flow through the ferro-resonant circuit and the relay 9. This sudden increase in current flow through the ferro-resonant circuit is indicated by the dotted line A', B in Fig. 1 of the drawing. A further gradual increase in the generator voltage will cause only a gradual increase in the current flow through the resonant circuit as indicated by the portion 20 of the curve in Fig. 1 of the drawing. The regulator system is so adjusted that the relay 9 will operate when the sudden rush of current is effected through the ferro-resonant circuit.

If the generated voltage is gradually reduced from a voltage above the voltage B, a sudden decrease in the current flow through the resonant circuit will not be effected when the voltage B is reached. However, when a voltage C below the voltage B is reached a sudden drop in current flow through the resonant circuit will be effected, as indicated by the dotted line C, D. Below the voltage C a gradual decrease in the generated voltage effects a gradual decrease in the current flow through the ferro-resonant circuit. If the generator voltage is again raised from a voltage below C the current flow through the ferro-resonant circuit will gradually increase until the voltage A is reached when there will again be a sudden increase in the current flow through the ferro-resonant circuit.

The relay 9 is operated upon the sudden increase in current flow through the ferro-resonant circuit for operating the switch members 13 and 14 to control the resistance elements 15 and 16. The switch member 13 opens the shunt circuit around the control resistance element 15 to lower the current flow through the field winding 2 and decrease the generator voltage. The switch member 14 is constructed to open the shunt circuit around the control resistance element 16, a short period of time after the switch member 13 has opened the shunt circuit around the regulator resistance element 15. The control resistance element is inserted in the circuit of the relay. If the insertion of such resistance in the relay circuit brings the generated voltage supplied to the control circuit below the voltage C the relay 9 will be released to short-circuit the two resistance elements 15 and 16. Short-circuiting the resistance element 15 raises the excitation of the generator to raise the generated voltage. However, if the generator voltage is immediately raised to a point above the voltage A then the above operation will again be repeated. It is clear that the regulator resistance element 15 may be maintained in or out of the circuit of the field winding 2 for varying periods to hold the generated voltage substantially constant. The relay will operate intermittently very much in the manner of a relay in the Tirrill type of regulator.

In the above described operation it is assumed the frequency of the current supplied by the generator is substantially a constant. The jumping phenomena varies considerably with the frequency of the current as is indicated by the curves shown in Fig. 2 of the drawing. At a frequency of $F'$, which may be approximately 16 cycles, a sudden increase in current flow through the ferro-resonant circuit is effected at a voltage $A_1$. At a frequency of $F_2$, which may be considered a frequency of 18 cycles, a sudden increase in the current flow through the ferro-resonant circuit is effected at a higher voltage $A_2$. At a frequency $F_3$, which may be approximately 20 cycles, a sudden increase in the current flow through the ferro-resonant circuit is effected at a voltage $A_3$. It is apparent therefore that some provision must be made to take care of the changes in frequency of the current supplied to the ferro-resonant circuit if close voltage regulation is to be effected. The potentiometer arrangement comprising the condenser 6, resistance 7, and the inductance 8 is provided to compensate for any change in frequency in the alternating current supplied by the generator 1. As the frequency of the generated current rises, it is apparent that the voltage across the inductance element 8 rises and varies the voltage impressed on the ferro-resonant circuit. The condenser 6 and the inductance 8 may be designed to compensate for the effect of the changes in the frequency on the ferro-resonant circuit. The adjustable condenser 12 and the adjustable resistance element 7 are provided for adjusting the potentiometer circuit so that various standard pieces of apparatus may be utilized. It is of course understood that the resistance 7 and the adjustable condenser 12 may be dispensed with if all the elements of the circuit are designed specifically for the function to be performed. If the elements 7 and 12 are used in the system, they need only be adjusted when the system is installed.

Modifications in the system and in the arrangement and location of parts may be made within the spirit and scope of the invention and such modifications are intended to be covered by the appended claims.

What is claimed is:

1. In a voltage regulator system for an alternating-current generator having a regulator field-magnet winding, means comprising a relay for controlling said field winding, and a control circuit connected to the generator for operating said relay to maintain the generator voltage constant, said control circuit comprising reactance elements serving to effect a sudden increase in current to operate said relay at a predetermined generator voltage.

2. A voltage regulator system comprising an alternating-current generator having a regulator field-magnet winding, a regulator resistance for varying the current flow through said field winding, a relay for shunting said resistance element to control the generator excitation, and a control circuit for operating said relay to maintain the generator voltage constant comprising a capacity element and a coil having an iron core connected across the generator circuit, said control circuit serving to supply a sudden increase in current to operate said relay at a predetermined generator voltage.

3. In a voltage regulator system for an alternating-current generator having a field-magnet winding, means comprising a relay for controlling said field winding, a resistance element in the energizing circuit of said relay, a control circuit connected to the generator for operating said relay to maintain the generator voltage constant, means in said control circuit for causing a sudden increase in current to operate said relay at a predetermined generator voltage, and a switch member operated by said relay to control said resistance element to govern the release of the relay.

4. A voltage regulator system comprising an alternating-current generator having a regulator field-magnet winding, a regulator resistance element in series with said field winding, a condenser and an iron core coil in circuit with said generator, a relay in series circuit relation with said condenser and coil and operated upon a sudden change in the conductivity of the circuit including said condenser and coil at a determined generator voltage, a control resistance element in circuit with said relay, and means controlled by said relay for selectively shunting said resistance elements to maintain the generator voltage substantially constant.

5. A voltage regulator system comprising an alternating-current generator having a regulator field-magnet winding, control means comprising a condenser and a coil having an iron core connected in series across the generator circuit for controlling the excitation of said field winding to maintain the generator voltage substantially constant, and means for rendering the circuit of said condenser and the coil independent of the frequency of the generator current.

6. In a voltage regulator system for an alternating-current generator having a field-magnet winding, means comprising a relay for controlling said field winding to maintain the generator voltage constant, a control circuit comprising a condenser and a coil having a core connected to said generator for controlling said relay according to the generator voltage, means for rendering said control circuit independent of the frequency of the generator current, said control circuit serving to supply a sudden increase in current to operate said relay at a predetermined generator voltage, and means comprising a switch member operated by the relay for controlling the release of the relay.

7. A voltage regulator system comprising an alternating-current generator having a regulator field-magnet winding, means comprising a relay for controlling the excitation of said field winding to maintain the generator voltage substantially constant, and means comprising a condenser and a coil having an iron core connected in series across the generator circuit for supplying a predetermined increase in current at a predetermined generator voltage to operate said relay.

8. A voltage regulator system comprising an alternating-current generator having a regulator field-magnet winding, means comprising a relay for controlling the excitation of said field winding to maintain the generator voltage substantially constant, means comprising a condenser and a coil having an iron core connected in series across the generator circuit for supplying a predetermined increase in curent at a predetermined generator voltage to operate said relay, and means for rendering the relay controlled circuit independent of the frequency of the generator current.

9. A voltage regulator system comprising an alternating-current generator having a regulator field-magnet winding, a regulator resistance element in series with said field winding, a control circuit comprising a condenser and a coil having an iron core connected in series across the generator circuit, a control resistance element in series with said condenser and the coil, said condenser and coil being adjusted to cause a predetermined increase in current flow therethrough at a predetermined critical generator voltage and independently of the frequency of the generator voltage, a relay operated by said control circuit when the critical generator voltage is reached, a switch member serving upon operation of said relay to open a short circuit across the regulator resistance element, and a second switch member operated by said relay after the first switch member to open a short circuit across the control resistance element.

10. A voltage regulator system comprising an alternating-current generator having a regulator field-magnet winding, a relay for controlling the energization of said field winding, means comprising a control circuit having a condenser and a coil with an iron core connected in series across the generator circuit, said control circuit being adjusted to effect a sudden increase in current flow therethrough when the generator voltage is raised to a predetermined critical value and to effect a sudden decrease in the current flow therethrough when the generator voltage is reduced from the first critical value to a second critical value, said relay being operated at the first generator critical voltage and released at the second generator critical voltage, a regulator resistance element in circuit with said field-magnet winding, a control resistance element in the energizing circuit of said relay, and means comprising switch members operated by said relay for controlling said resistance elements to maintain the generator voltage substantially constant.

11. In a voltage regulator system for a generator operated to produce a current of substantially constant frequency, a regulator field winding for said generator, and means connected to the generator circuit for controlling said field winding to maintain the generator voltage constant and comprising reactance elements serving to effect a sudden increase in current flow therethrough at a predetermined generator voltage.

12. In a voltage regulator system for a generator operated to produce a current of substantially constant frequency, means comprising a relay for controlling said field winding, and means connected to the generator circuit for controlling said relay to maintain the generator voltage constant and comprising reactance elements serving to effect a sudden increase in current flow through the relay at a predetermined generator voltage.

13. A voltage regulator system comprising an alternating-current generator having a regulator field winding, and means for controlling said field winding to maintain the generator voltage constant and comprising a condenser and a coil having an iron core connected in series across the generator circuit to effect a sudden increase in current flow therethrough at a predetermined generator voltage.

14. A voltage regulator system comprising an alternating-current generator having a regulator field winding, control means connected to the generator circuit for controlling said field winding to maintain the generator voltage constant and comprising reactance elements serving to effect a sudden increase in current flow therethrough at a predetermined generator voltage, and means for rendering said control means independent of the generator frequency.

15. A voltage regulator system for an alternating current generator, a regulator field winding for controlling the voltage of said generator, a control circuit comprising a condenser and an iron core coil connected across the generator circuit, and means governed by the jumping phenomena of said control circuit for controlling said field winding to maintain the generator voltage constant.

16. A voltage regulator system for an alternating current generator, a control circuit comprising a condenser and an iron core coil connected across the generator circuit, and means governed by the jumping phenomena of said control circuit for maintaining the generated voltage constant.

In witness whereof, we hereunto subscribe out names this 5th day of November, 1928.

LELAND J. STACY.
MYRON E. KROM.